United States Patent
Shalev et al.

(10) Patent No.: US 10,853,448 B1
(45) Date of Patent: Dec. 1, 2020

(54) HIDING LATENCY OF MULTIPLIER-ACCUMULATOR USING PARTIAL RESULTS

(71) Applicant: Habana Labs Ltd., Tel Aviv (IL)

(72) Inventors: Ron Shalev, Pardes Hanna-Karkur (IL); Tomer Rothschild, Ein-Vered (IL)

(73) Assignee: HABANA LABS LTD., Caesarea (IL)

(*) Notice: Subject to any disclaimer, the term of this patent is extended or adjusted under 35 U.S.C. 154(b) by 668 days.

(21) Appl. No.: 15/700,213

(22) Filed: Sep. 11, 2017

Related U.S. Application Data (60) Provisional application No. 62/393,121, filed on Sep. 12, 2016.

(51) Int. Cl.
  *G06F 17/16* (2006.01)
  *G06F 7/78* (2006.01)
  *G06F 15/80* (2006.01)

(52) U.S. Cl.
  CPC .............. *G06F 17/16* (2013.01); *G06F 7/78* (2013.01); *G06F 15/8046* (2013.01)

(58) Field of Classification Search
  CPC .......................... G06F 17/15–153; G06F 17/16
  See application file for complete search history.

(56) References Cited

U.S. PATENT DOCUMENTS

| | | |
|---|---|---|
| 4,760,518 A | 7/1988 | Potash et al. |
| 5,099,447 A * | 3/1992 | Myszewski .............. G06F 17/16 708/607 |
| 5,226,171 A * | 7/1993 | Hall .......................... G06F 17/16 712/3 |
| 5,471,627 A | 11/1995 | Means et al. |
| 6,675,187 B1 | 1/2004 | Greenberger |
| 7,543,119 B2 | 6/2009 | Hessel et al. |
| 9,262,165 B2 | 2/2016 | Hatano et al. |
| 9,647,667 B1 | 5/2017 | Perry |

(Continued)

FOREIGN PATENT DOCUMENTS

EP 0517241 A2 * 12/1992 ........... G06F 7/5443

OTHER PUBLICATIONS

Keller, "Computational Foundation of Cognitive Science—Lecture 15: Convolutions and Kernels", Feb. 23, 2010, retrieved from http://www.inf.ed.ac.uk/teaching/courses/cfcsl/lectures/cfcs_l15.pdf (Year: 2010).*

(Continued)

*Primary Examiner* — Matthew D Sandifer
(74) *Attorney, Agent, or Firm* — Kligler & Associates Patent Attorneys Ltd

(57) ABSTRACT

Computational apparatus includes a memory, which is configured to contain multiple matrices of input data values. An array of processing elements is configured to perform multiplications of respective first and second input operands and to accumulate products of the multiplication to generate respective output values. Data access logic is configured to select from the memory a plurality of mutually-disjoint first matrices and a second matrix, and to distribute to the processing elements the input data values in a sequence that is interleaved among the first matrices, along with corresponding input data values from the second matrix, so as to cause the processing elements to compute, in the interleaved sequence, respective convolutions of each of the first matrices with the second matrix.

24 Claims, 8 Drawing Sheets

(56) References Cited

U.S. PATENT DOCUMENTS

| | | | |
|---|---|---|---|
| 10,387,122 | B1 | 8/2019 | Olsen |
| 10,685,082 | B2* | 6/2020 | Bekas ............... G06F 17/16 |
| 2003/0225805 | A1 | 12/2003 | Nash |
| 2006/0095258 | A1 | 5/2006 | Jeong et al. |
| 2007/0143574 | A1* | 6/2007 | Bonebakker ........ G06F 9/30036 |
| | | | 712/2 |
| 2008/0052693 | A1 | 2/2008 | Archambault et al. |
| 2011/0307459 | A1 | 12/2011 | Jacob (Yaakov) |
| 2014/0181171 | A1 | 6/2014 | Dourbal |
| 2015/0269122 | A1 | 9/2015 | Lang |
| 2017/0147531 | A1* | 5/2017 | Bekas ............... G06F 17/16 |
| 2017/0255572 | A1 | 9/2017 | Rohe et al. |
| 2017/0344514 | A1 | 11/2017 | Zhou |
| 2018/0074962 | A1 | 3/2018 | Giefers et al. |
| 2018/0074996 | A1 | 3/2018 | Ling et al. |
| 2018/0336163 | A1 | 11/2018 | Phelps et al. |
| 2019/0012295 | A1 | 1/2019 | Yinger et al. |
| 2019/0303743 | A1 | 10/2019 | Venkataramani et al. |

OTHER PUBLICATIONS

Wikipedia.org, "Outer Product", dated May 28, 2020, retrieved from https://en.wikipedia.org/w/index.php?title=Outer_product&oldid=959358295 (Year: 2020).*

Wikipedia.org, "Matrix Multiplication", dated Jun. 2, 2020, retrieved from https://en.wikipedia.org/w/index.php?title=Matrix_multiplication&oldid=96041746 (Year: 2020).*

U.S. Appl. No. 15/700,207 office action dated Oct. 1, 2018.

Chetlur et al., "cuDNN: Efficient Primitives for Deep Learning", NVIDIA, Santa Clara, CA, arXiv:1410.0759v3 [cs.NE], pp. 1-9, Dec. 18, 2014.

Suda et al., "Throughput-Optimized OpenCL-based FPGA Accelerator for Large-Scale Convolutional Neural Networks", FPGA '16 Proceedings of the 2016 ACM/SIGDA International Symposium on Field-Programmable Gate Arrays, pp. 16-25, Feb. 21-23, 2016.

Abuzaid et al., "Caffe con Troll: Shallow Ideas to Speed Up Deep Learning", DanaC'15 Proceedings of the Fourth Workshop on Data analytics in the Cloud, Article No. 2, 6 pages, May 31-Jun. 4, 2015.

Yang et al., "A Systematic Approach to Blocking Convolutional Neural Networks", Stanford University, arXiv:1606.04209v1 [cs.DC], pp. 1-12, Jun. 14, 2016.

Lim et al., "Multidimensional systolic arrays for the implementation of discrete Fourier transforms", IEEE Transactions on Signal Processing, vol. 47, issue 5, pp. 1359-1370, May 1999.

Mellott et al., "The Gauss machine: A Galois-enhanced quadratic residue number system systolic array", Proceedings of IEEE 11th Symposium on Computer Arithmetic, pp. 156-162, Jun. 1993.

Scheiman et al., "A processor-time-minimal schedule for the standard tensor product algorithm", IEEE computer Society, pp. 176-187, year 1994.

U.S. Appl. No. 16/136,294 office action dated Mar. 3, 2020.

U.S. Appl. No. 16/170,069 office action dated Apr. 14, 2020.

Shalev et al., U.S. Appl. No. 15/700,207, filed Sep. 11, 2017.

U.S. Appl. No. 16/186,620 Office Action dated Jul. 22, 2020.

U.S. Appl. No. 16/170,069 Office Action dated Sep. 11, 2020.

* cited by examiner

HIDING LATENCY OF MULTIPLIER-ACCUMULATOR USING PARTIAL RESULTS

CROSS-REFERENCE TO RELATED APPLICATION

This application claims the benefit of U.S. Provisional Patent Application 62/393,121, filed Sep. 12, 2016. This application is related to U.S. patent application Ser. No. 15/700,207, filed Sep. 11, 2017. Both of these related applications are incorporated herein by reference.

FIELD OF THE INVENTION

The present invention relates generally to computational devices, and specifically to apparatus and methods for high-speed parallel computations.

BACKGROUND

Multi-dimensional convolutions are a basic building block in many applications. For example, convolutional neural nets (CNNs) are being used increasingly in complex classification and recognition tasks, such as large-category image classification, object recognition, and automatic speech recognition.

In the convolutional layers of the CNN, a three-dimensional (3D) array of input data (commonly referred to as a 3D matrix or tensor) of dimensions M×N×D is convolved with a four-dimensional tensor made up of L kernels of dimension j×k×D and stride S. Here M and N are the dimensions of the sampling space (also referred to as the X and Y dimensions), for example pixels of an image, while D (also referred to herein as the Z-dimension) is the number of input feature values given for each sample. Each 3D kernel is shifted in strides of size S across the input volume. Following each shift, every weight belonging to the 3D kernel is multiplied by each corresponding input element from the overlapping region of the 3D input array, and the products are summed to create an element of a 3D output array.

General-purpose processors are not capable of performing these computational tasks efficiently. For this reason, special-purpose hardware architectures have been proposed, with the aim of parallelizing the large numbers of matrix multiplications that are required by the CNN.

SUMMARY

Embodiments of the present invention that are described hereinbelow provide improved apparatus and methods for performing parallel computations over large arrays of data.

There is therefore provided, in accordance with an embodiment of the invention, computational apparatus, including a memory, which is configured to contain multiple matrices of input data values. An array of processing elements is configured to perform multiplications of respective first and second input operands and to accumulate products of the multiplication to generate respective output values. Data access logic is configured to select from the memory a plurality of mutually-disjoint first matrices and a second matrix, and to distribute to the processing elements the input data values in a sequence that is interleaved among the first matrices, along with corresponding input data values from the second matrix, so as to cause the processing elements to compute, in the interleaved sequence, respective convolutions of each of the first matrices with the second matrix.

In some embodiments, the first matrices are mutually-disjoint sub-matrices of a single input matrix that is stored in the memory, and the data access logic is configured to partition the input matrix into the mutually-disjoint sub-matrices and to combine the output values of the respective convolutions to generate an output matrix representing a convolution of the input matrix with the second matrix.

In some of these embodiments, the data access logic is configured to partition the input matrix by dividing the input matrix into multiple adjoining tiles, each sub-matrix corresponding to a respective tile, and to concatenate the output values of the respective convolutions to generate the output matrix. In a disclosed embodiment, the data access logic is configured to further partition each of the tiles by assigning, in the interleaved sequence, successive rows or columns of each tile to different ones of the sub-matrices, and to sum the output values of the respective convolutions to generate output tiles, which are concatenated to generate the output matrix. In one embodiment, the data access logic is configured to distribute the input data values so that the processing elements simultaneously multiply a given row or column in each of the tiles by the same column or row in the second matrix.

Additionally or alternatively, the data access logic is configured to partition the input matrix into first tiles, with corresponding first sub-matrices, and further to partition the second matrix into second tiles, with corresponding second sub-matrices, and to distribute the input data values so that the processing elements convolve each of the first sub-matrices with each of the second sub-matrices to generate output tiles, which are concatenated to generate the output matrix.

Further additionally or alternatively, the data access logic is configured to partition the input matrix by assigning, in the interleaved sequence, successive rows or columns of the input matrix to different ones of the sub-matrices, and to sum the output values of the respective convolutions to generate the output matrix. In a disclosed embodiment, the processing elements are configured to sum the output values only after completing computation of the respective convolutions of the sub-matrices.

In a disclosed embodiment, each of the processing elements includes multiple registers and is configured to accumulate the products of the multiplication for each of the first matrices in a different, respective one of the registers in accordance with the interleaved sequence. Typically, the processing elements have a latency of a given number of clock cycles for each multiply-accumulate operation, and the data access logic is configured to select and distribute the input data values in the interleaved sequence from a number of the first matrices that is equal to the given number. Additionally or alternatively, the data access logic is configured to transpose at least one of the first and second matrices before distributing the input data values.

In some embodiments, the interleaved sequence in which the input data values are distributed to the processing elements is selected so that the array of processing elements computes respective outer products of a succession of vector pairs, each vector pair including a first vector selected from one of the first matrices and a second vector selected from the second matrix, and sums the outer products to generate multiple third matrices representing the respective convolutions. In a disclosed embodiment, the data access logic is configured to broadcast the extracted data values in each vector pair to the processing elements so that each extracted data value is distributed to multiple processing elements, such that in each processing cycle, the array of the processing elements computes all matrix elements of an outer product of the first and second vectors in a single processing cycle.

There is also provided, in accordance with an embodiment of the invention, a method for computation, which includes storing in a memory multiple matrices of input data values. The input data values from the first matrices are distributed in a sequence that is interleaved among the first matrices, along with corresponding input data values from the second matrix, to an array of processing elements, each configured to perform multiplications of respective first and second input operands and to accumulate products of the multiplication to generate respective output values. The distributed data values are multiplied, and the products are accumulated in the processing elements so as to compute, in the interleaved sequence, respective convolutions of the first matrices with the second matrix.

The present invention will be more fully understood from the following detailed description of the embodiments thereof, taken together with the drawings in which:

DETAILED DESCRIPTION OF EMBODIMENTS

Overview

Hardware-based matrix multiplication accelerators, such as the matrix multiplication engine described in the above-mentioned patent application, typically comprise an array of processing elements, which perform repetitive multiply and accumulate operations on arrays of operands that are loaded by data access logic. These processing elements are designed to perform multiply-accumulate operations of the form $C \Leftarrow A \times B + C$, in which A and B are the data values of the operands and C is the accumulated result. The speed of operation is inherently limited by the latency of the processing element, i.e., by the number of clock cycles from the input of the value of C for one stage of the computation until the updated value of C has been computed and is ready for input to the next stage. Thus, for example, if a fused multiplier-adder (FMA), as is known in the art, requires four clock cycles for each such stage, the output of the computation will be updated at only 25% of the clock rate.

Embodiments of the present invention that are described herein provide techniques for enhancing the efficiency of utilization of such an array of processing elements, as well as devices implementing such techniques. These techniques effectively hide the inherent latency of the processing elements and make it possible to achieve full utilization, so that outputs are updated as often as every clock cycle.

In the disclosed embodiments, this high efficiency is achieved in a computational accelerator, which receives in its memory multiple input matrices of input data values that are to be multiplied together. Data access logic in the accelerator selects a number of mutually-disjoint matrices that are all to be multiplied by the same matrix (for example, multiple matrices of data values, A0, . . . , An, that are to be multiplied by the same kernel matrix, B). The data access logic distributes the input data values from the disjoint input matrices to the processing elements in a sequence that is interleaved among the sub-matrices, together with corresponding input data values from the other matrix. This partitioning and interleaved data distribution cause the processing elements to compute, in the same interleaved sequence, a respective convolution of each of the disjoint matrices with the other matrix, while reducing the relative burden of memory access since many of the input data values are reused from one computation to the next.

The number of matrices that are used in this process can be chosen to match, and thus hide, the inherent latency of the processing elements. For example, assuming the processing elements comprise fused multiply-adders (FMAs) with four pipeline stages from input to output—meaning a latency of four clock cycles—the data access logic can select and interleave input data values from four disjoint matrices. By interleaving the input data values from the four matrices in sequence, each processing element will be able to generate a new accumulated value of C in each clock cycle, so that the output matrices can be generated at almost the full clock rate of the accelerator. The detailed example embodiments that are presented below are based on an array of FMAs with a four-stage pipeline, and therefore interleave input data from four different matrices. The techniques and partitioning schemes that are described herein, however, may be adapted in a straightforward manner to smaller and larger numbers of interleaved matrices, depending on the characteristics of the computational accelerator and application requirements.

In some embodiments, the data access logic in the accelerator generates the multiple input matrices by partition a single input matrix into multiple, mutually-disjoint sub-matrices. Each of these sub-matrices is individually convolved with the other matrix, and the output values of these convolutions are then combined in order to generate an output matrix representing a complete convolution of the two input matrices.

A number of different modes of partitioning the input matrices are described hereinbelow. For example, in some embodiments, the data access logic partitions at least one of the input matrices by dividing the matrix into multiple adjoining tiles, with each sub-matrix corresponding to a respective tile. The processing elements compute a respective convolution of each such tile with the other input matrix, and the data access logic then concatenates the output values of the respective convolutions to generate the output matrix.

Alternatively or additionally, the data access logic can partition one or both of the input matrices by assigning, in the interleaved sequence, successive rows or columns of the matrix to different sub-matrices. After convolving each of these interleaved sub-matrices, the processing elements sum the output values of the respective convolutions to generate the output matrix. Variants and combinations of these example interleaving techniques will be apparent to those skilled in the art after reading the present description and are considered to be within the scope of the present invention.

System Description

Figure 1:
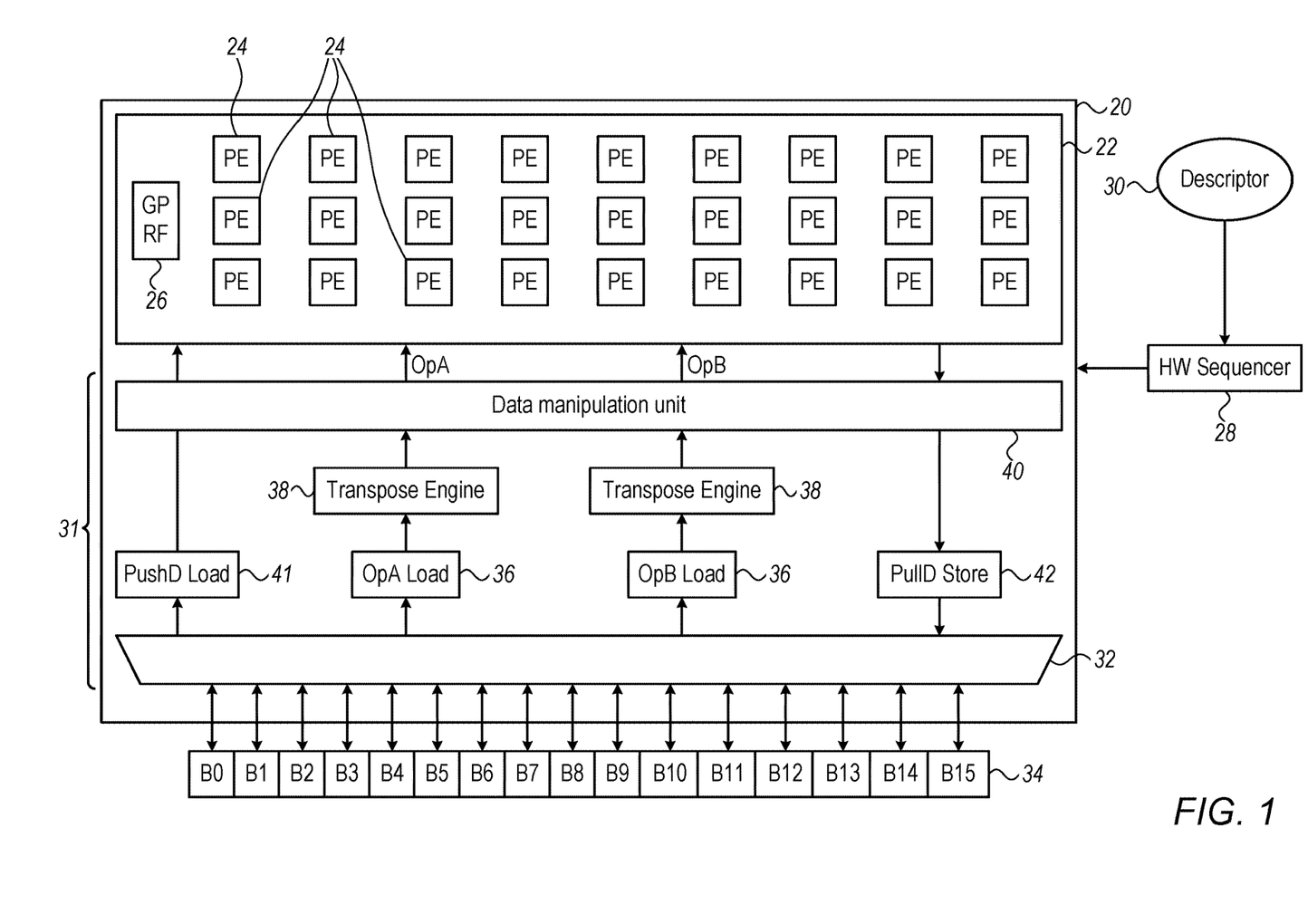
FIG. 1 is a block diagram that schematically illustrates a matrix multiplication engine, in accordance with an embodiment of the invention.

FIG. 1 is a block diagram that schematically illustrates a matrix multiplication engine 20, in accordance with an embodiment of the invention. The elements of this matrix multiplication engine are typically implemented in dedicated hardware logic circuits in an integrated circuit chip or chip set. The hardware logic circuits may be hard-wired or programmable. Alternatively or additionally, some of the functions illustrated in FIG. 1 may be carried out in software or firmware by a programmable processor.

Figure 2:
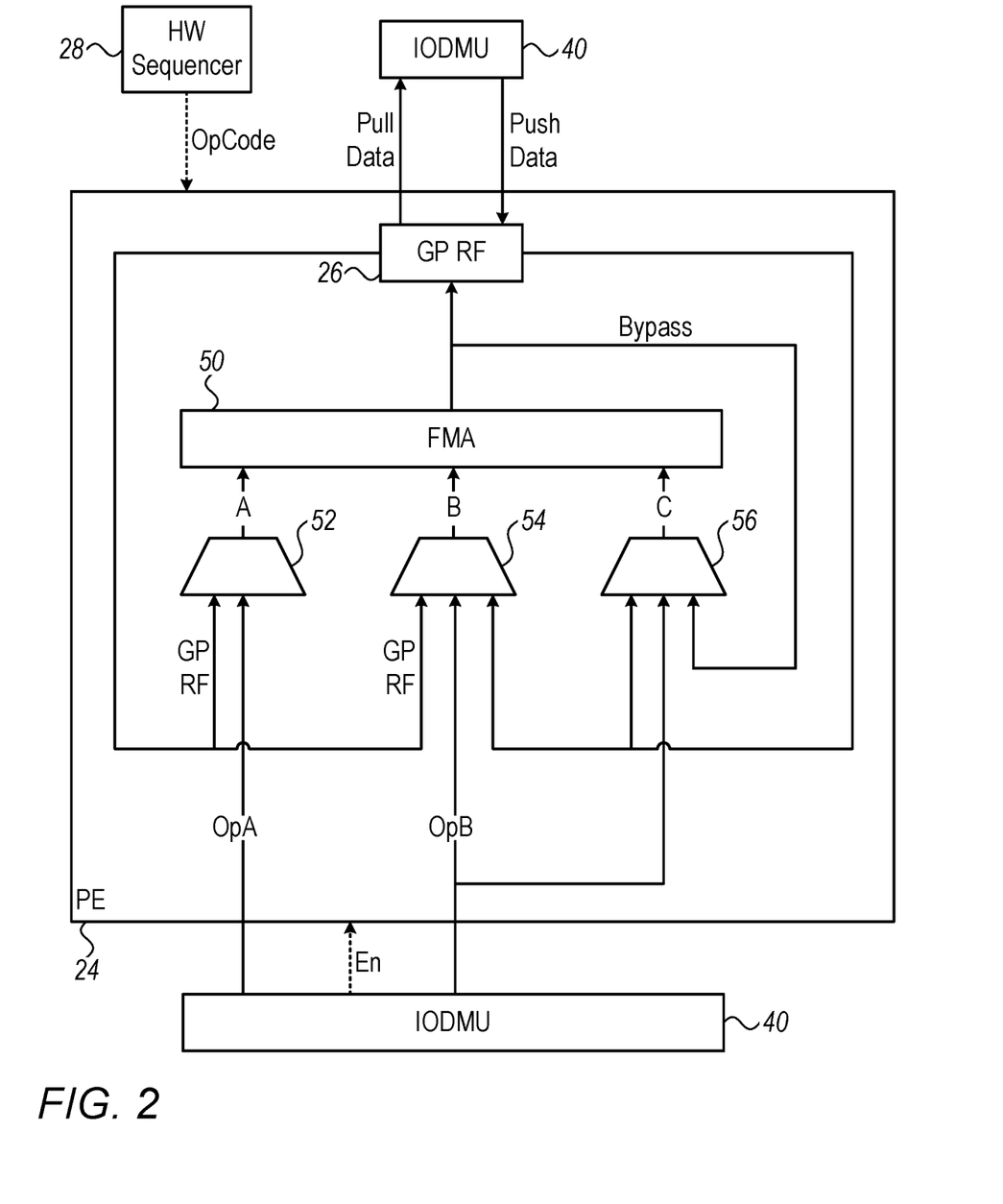
FIG. 2 is a block diagram that schematically illustrates a processing element in a matrix multiplication engine, in accordance with an embodiment of the invention.

Computations in engine 20 are carried out by an execution unit 22, comprising an array of processing elements 24, which perform multiply and accumulate operations while reading and writing data to a general-purpose register file (GP RF) 26. Details of the design and operation of processing elements 24 are shown in FIG. 2. Although GP RF 26 is shown in FIG. 1, for the sake of simplicity, as a single block, the registers in the GP RF are, in fact, distributed among processing elements 24. Furthermore, although execution unit 22 is shown in FIG. 1, for the sake of example, as containing a certain number of rows and columns of processing elements 24, in practice the execution unit may comprise a grid of processing elements with any desired numbers of rows and columns. For example, in one embodiment, execution unit 22 comprises 512 processing elements. In general, the number of rows and columns of processing elements 24 determines the sizes of the matrices that execution unit 22 can convolve in a single pass, since each processing element is responsible for computing the output value of a respective element of the product matrix. Larger matrices can be broken into smaller chunks for processing by execution unit 22.

A hardware sequencer 28 provides commands to execution unit 22 and to data access logic 31, which extracts and distributes input data values to processing elements 24 from 3D matrix data held in a memory 34. Descriptors 30 indicate the operations that are to be performed and the ranges of data over which execution unit 22 is to perform the operations. These operations typically include at least the following:

$C=\alpha AB+\beta C$ $C=\alpha AB^T+\beta C$ $C=\alpha A^TB+\beta C$ $C=\alpha A^TB^T+\beta C$ Here A, B and C are matrices, $\alpha$ and $\beta$ are scalars, and $A^T$ means that matrix A is transposed. Descriptors 30 may be written by a human programmer of engine 20 or generated automatically, for example by a central processing unit (CPU) or system controller (not shown), based on a definition of the required computational tasks. Engine 20 carries out the commands of hardware sequencer 28 in order, and writes the computational results (matrix C) back to memory 34.

Data access logic 31 in engine 20 comprises a memory controller 32, which reads from and writes to memory 34, along with load units 36 and 41, transpose engines 38, an input/output data manipulation unit (IODMU) 40, and a store unit 42. For efficient data access, memory 34 is tightly coupled to controller 32, with multiple banks (labeled B0 through B15) having respective input/output connections to controller 32. In accordance with descriptors 30, load units 36 instruct memory controller 32 to extract vectors of input data values to serve as operands A and B. These values are then distributed among processing elements 24 by data manipulation unit 40. Examples of these data extraction, manipulation and distribution functions are described hereinbelow with reference to FIGS. 3-8B.

Prior to distribution of the input data values to processing elements 24, transpose engines 38 transpose one or both of the vectors from row to column form. Assuming memory controller 32 retrieves the input data values row by row, for example, transpose engine 38 will receive and save a sufficient number of rows to be able to read out columns of data of the appropriate length to data manipulation unit 40, for delivery to processing elements 24.

The commands to execution unit 22 also indicate to processing elements 24 which entry or entries in GP RF 26 should be used in each computational step. A push data load unit 41 loads specified data from memory 34 into GP RF 26 as required for each computation, while a pull data store unit 42 reads the output values from the appropriate entries GP RF 26 and stores them in memory 34.

FIG. 2 is a block diagram that schematically shows details of one of processing elements 24, in accordance with an embodiment of the invention. The core of processing element 24 in this embodiment is a fused multiplier-adder (FMA) 50, as is known in the art, which receives three inputs, labeled A, B and C, and outputs a result to a designated entry in GP RF 26. FMA 50 is advantageous in its ability perform multiply-accumulate operations (of the form $C \Leftarrow A \times B + C$) efficiently, but other sorts of multiplier-accumulators may alternatively be used. Typically, FMA 50 comprises a processing pipeline with a certain number of stages, for example, four stages, each requiring a single clock cycle to complete (meaning that the latency of the FMA from input to output in this case is four clock cycles).

A set of multiplexers 52, 54 and 56 provide inputs A, B and C to FMA 50. The multiplexers are configured according to operation codes (opcodes) provided at each cycle by sequencer 28. Thus, multiplexer 52 may provide either operand A from data manipulation unit 40 or a value stored in GP RF 26 as input A; either operand B or a value read from either of two ports of GP RF 26 as input B; and either operand B, a value stored in GP RF 26, or the direct output of FMA 50 as input C. (This latter direct output is referred to in the figure as a "bypass" value.) Data manipulation unit 40 raises an enable (En) flag to signal to processing element 24 that the input data values are valid.

The use of multiple entries and multiple ports in GP RF 26 makes it possible for different computations, as well as data push and pull operations, to be interleaved, thus enabling full utilization of the computational capabilities of FMA 50. For each processing element 24, GP RF 26 comprises multiple registers, and the processing element can accumulate the product of the multiplication in each cycle in a different, respective register, as indicated by the corresponding descriptor. Thus, when multiply-accumulate operations on different matrices are interleaved in a certain sequence, the choice of registers in GP RF 26 to use for reading inputs and writing results is likewise interleaved in accordance with the sequence.

The description that follows presents various techniques for enhancing the efficiency of matrix computations. These techniques are described, for the sake of concreteness and clarity, with reference to the specific design of engine 20 that is shown in FIGS. 1 and 2 and described above in detail. The principles of these techniques, however, may likewise be applied in other computational accelerators having appropriate arrays of multiplier-accumulators, as are known in the art. All such alternative implementations are considered to be within the scope of the present invention.

Efficient Matrix Multiplication

Figure 3:
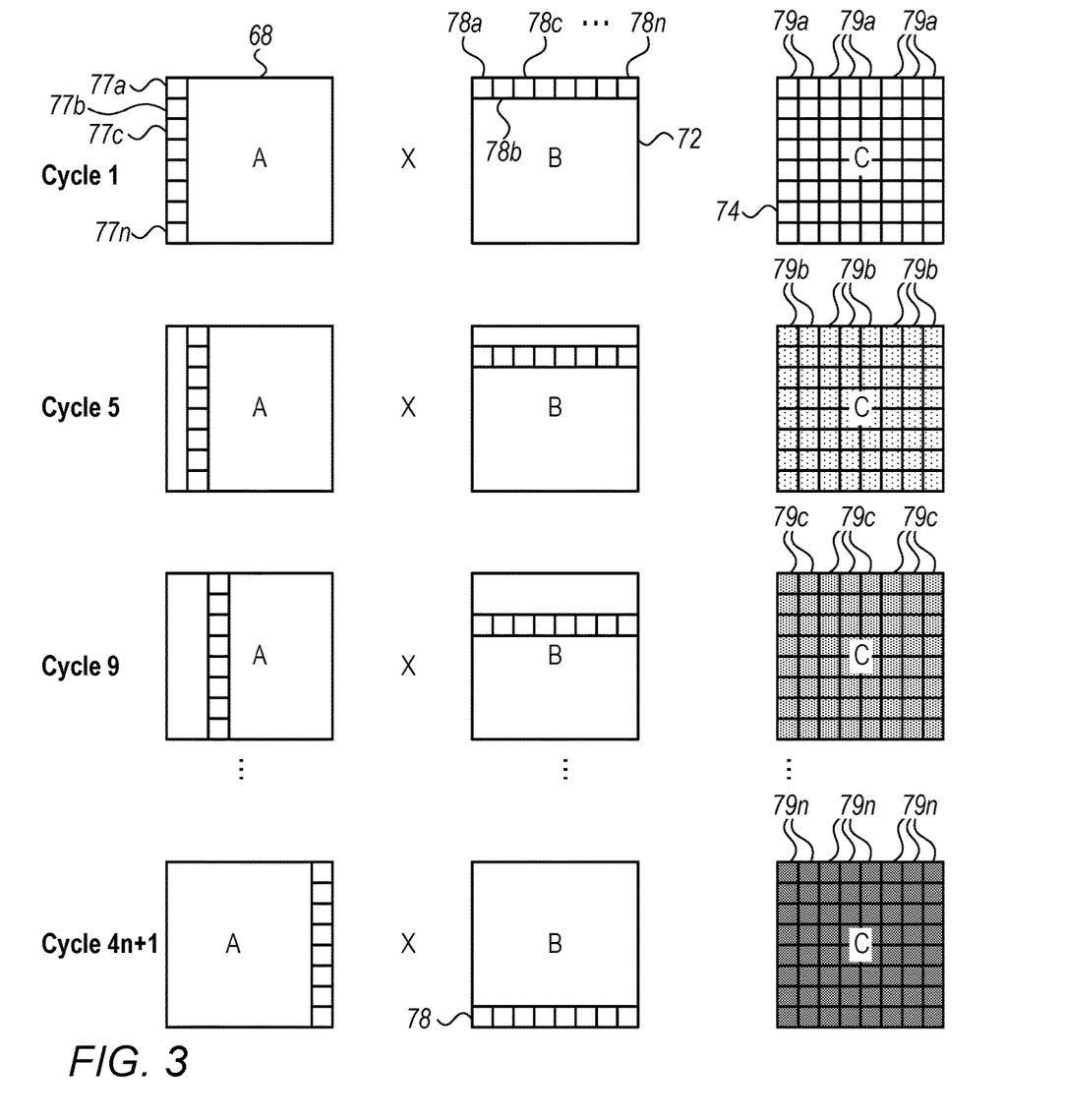
FIG. 3 is a block diagram that schematically illustrates successive stages in a process of matrix multiplication carried out by an array of processing elements, in accordance with an embodiment of the invention.
Figure 4:
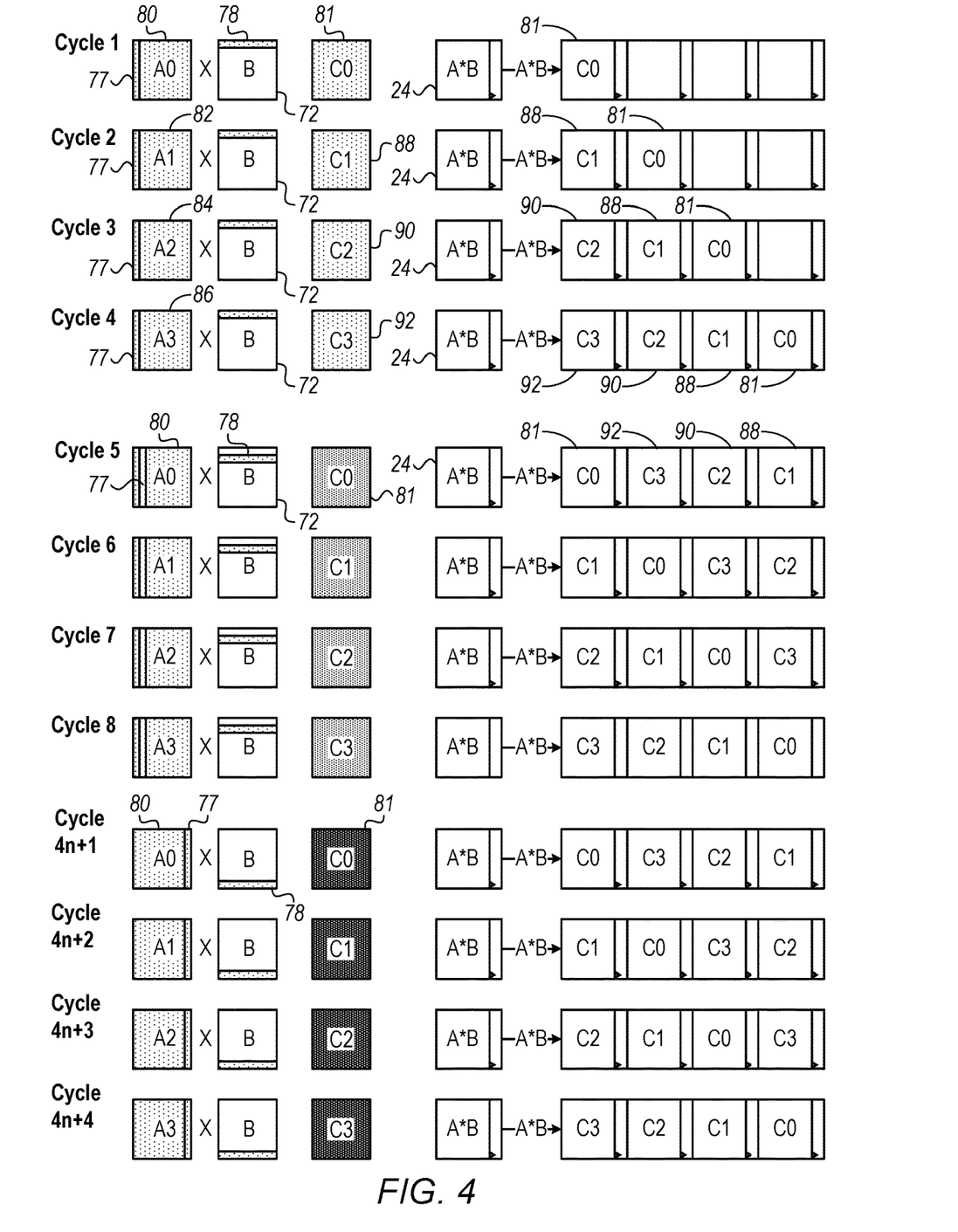
FIG. 4 is a block diagram that schematically illustrates successive cycles in a method for matrix multiplication with enhanced efficiency, in accordance with an embodiment of the invention.

FIG. 3 is a block diagram that schematically illustrates successive stages in a process of matrix multiplication carried out by processing elements 24 in execution unit 22, in accordance with an embodiment of the invention. In this example, for the sake of simplicity, input matrices 68 and 72 are assumed to be square, with dimensions n×n. Execution unit 22 is likewise assumed to comprise an array of n×n processing elements 24. Each multiply-accumulate stage is assumed to require four cycles of execution unit 22, and FIG. 4 shows the data inputs and outputs of each such stage in succession, up to the nth stage, at which the computation is completed. Thus, completion of all n stages requires 4n clock cycles. The figures that follow show techniques for interleaving of multiple computations so that, for example, four interleaved computations of this sort can be completed within 4n clock cycles.

In the example shown in FIG. 3, execution unit 22 computes and sums a sequence of outer products of vectors 77 and 78, which are selected respectively from matrices 68 and 72. Vector 77 comprises data values 77$a$, 77$b$, 77$c$, . . . , 77$n$, which are arranged by transposition as a column of matrix 68, while vector 78 comprises a row of data values 78$a$, 78$b$, 78$c$, . . . , 78$n$. In each cycle, execution unit 22 computes the outer products of a different vector pair of this sort, while data manipulation unit 40 steps to a new column and a new row of matrices 68 and 72, respectively. The resulting outer products are accumulated, cycle by cycle, to elements 79 of output matrix 74, so that at the conclusion of all n stages, matrix 74 contains the final result of a multiplication between matrices 68 and 72.

Each processing element 24 is responsible for computation of a single, corresponding element 79 of output matrix 74, by successive multiplication and accumulation of the appropriate elements of vectors 77 and 78 at each cycle. To facilitate this computation, data manipulation unit 40 broadcasts data values 77$a$, 77$b$, 77$c$, . . . , 77$n$, and 78$a$, 78$b$, 78$c$, . . . , 78$n$ to processing elements 24 such that each retrieved data value is distributed to multiple processing elements. In other words, in each stage, all of the processing elements in the first row of the array of processing units 24 in execution unit 22 receive and multiply element 77$a$ by a corresponding element from vector 78, while all of the processing elements in the first column multiply a corresponding element from vector 77 by element 78$a$, and so forth. Thus, in each processing cycle, the array of processing elements 24 computes all of the matrix elements of the outer product of vectors 77 and 78 in that processing cycle and sums the product with the result of the previous stage until the convolution is completed.

FIG. 4 is a block diagram that schematically illustrates a method for matrix multiplication by execution unit 22 with enhanced efficiency, in accordance with an embodiment of the invention. In this example, data access logic 31 selects four mutually-disjoint matrices 80, 82, 84 and 86, labeled A0, A1, A2 and A3, for multiplication by the same matrix 78 (B). The dimensions of the matrices can be chosen to equal the dimensions of the array of processing elements 24, so that the resources of execution unit 22 are fully utilized in each computation; but alternatively, smaller matrices may be selected, or larger input matrices may be partitioned into smaller sub-matrices that match the dimensions of the array of processing elements.

Data access logic 31 loads input data values of matrices 80, 82, 84 and 86 into execution unit 22 in an interleaved sequence, with data values selected from a different matrix in each clock cycle. Processing elements 24 compute, in turn, respective multiplications of these interleaved matrices 80, 82, 84 and 86 with matrix 72, in the manner described above with reference to FIG. 3, thus producing output matrices 81, 88, 90 and 92, labeled C0, C1, C2 and C3.

FIG. 4 shows successive cycles in the operation of execution unit 22 and data access logic 31, which repeats an interleaved sequence every four cycles: In cycle 1, processing elements 24 operate on vector 77 from matrix 80 and vector 78 from matrix 72, and compute the outer product of these vectors in the manner described above with reference to FIG. 3. The processing elements save the respective results in registers that are assigned to matrix 81 in GP RF 26. In cycles 2, 3 and 4, processing elements 24 perform the same operation on vector 77 from the same position in matrices 82, 84 and 86, respectively, in succession. At cycle 5, the sequence returns to process vector 77 at the next position in matrix 80, and so forth until all of the vectors from all of the sub-matrices have been multiplied and the results summed in the corresponding registers.

The right side of FIG. 4 shows the pipelined operation of one of processing elements 24. Data access logic 31 feeds the appropriate input data values (A and B) from vectors 77 and 78 to processing element 24 one cycle before they are required for the computation. In each cycle, the value A is taken from a different matrix. The output value (C) from the same matrix, with which the product A*B is to be summed, is fed back from the end of the pipeline of element 24 in the previous cycle. Thus, the pipeline progresses in a repeating, interleaved four-cycle sequence among matrices 81, 88, 90 and 92 until all n×n elements of all of the output matrices 81, 88, 90 and 92 have been computed.

Figure 5A:
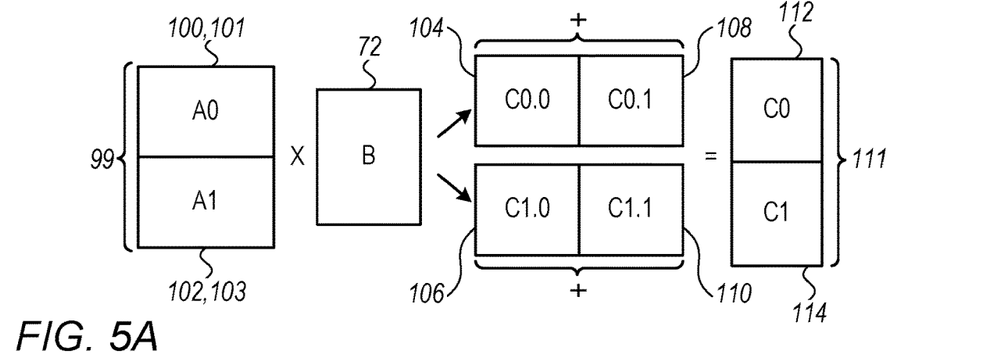
FIG. 5A is a block diagram that schematically illustrates a method for matrix multiplication with enhanced efficiency, in accordance with another embodiment of the invention.
Figure 5B:
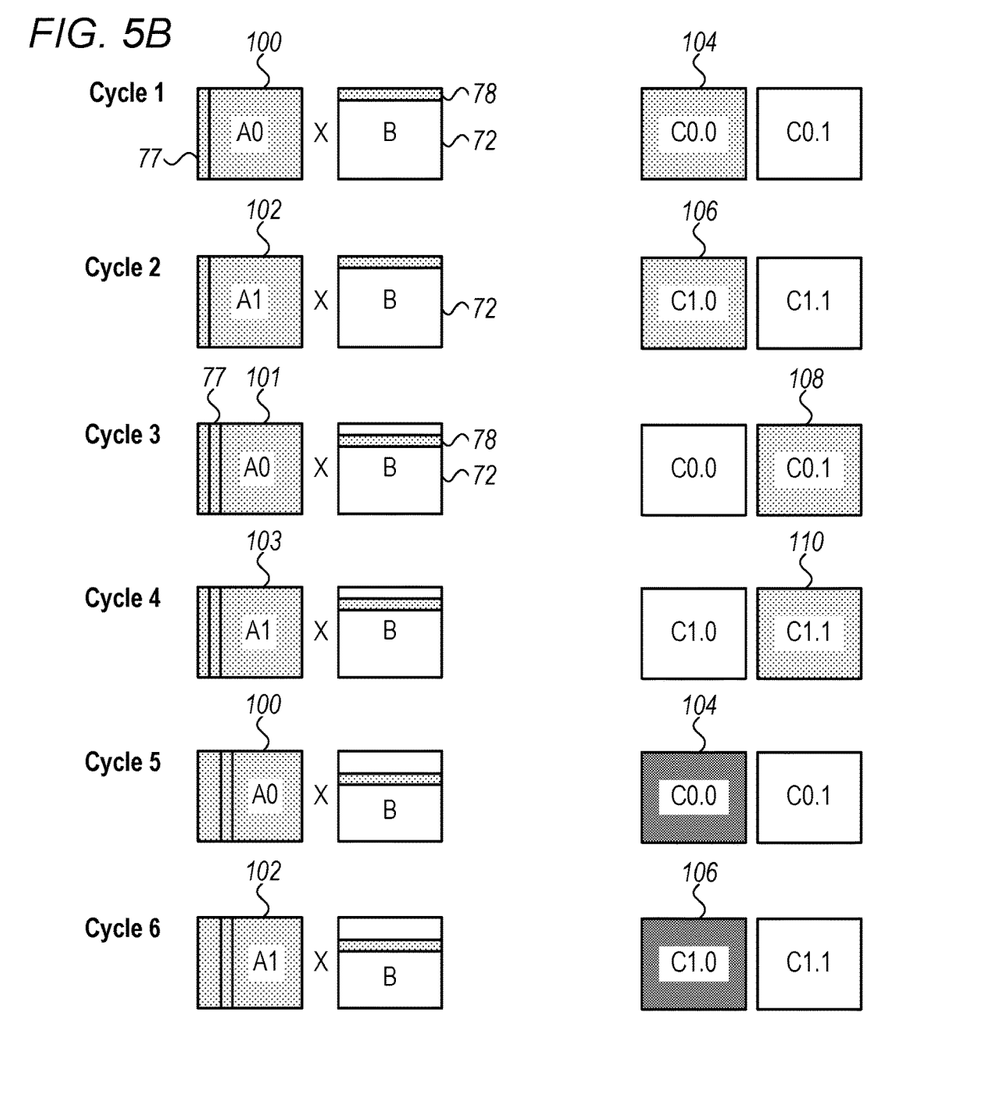
FIG. 5B is a block diagram that schematically shows successive cycles in the method of FIG. 5A, in accordance with an embodiment of the invention.

Reference is now made to FIGS. 5A and 5B, which are block diagrams that schematically illustrate an efficient method for matrix multiplication by execution unit 22, in accordance with another embodiment of the invention. FIG. 5A shows the structure of tiles into which an input matrix 99 is partitioned, while FIG. 5B shows successive cycles in this method. Each tile defines one or more corresponding sub-matrices. The sub-matrices correspond to "tiles" in the sense that they cover all the elements of matrix 99 without gaps or overlaps between the tiles.

In this embodiment, data access logic 31 partitions input matrix 99 into two adjoining tiles, A0 and A1. In addition, data access logic 31 further partitions each of these tiles by assigning, in interleaved sequence, successive columns of each tile to different, alternating sub-matrices. (Alternatively or additionally, the tiles could be partitioned by rows.) Thus, tile A0 is partitioned into sub-matrices 100 and 101, while tile A1 is partitioned into sub-matrices 102 and 103. As can be seen in FIG. 5B, sub-matrices 100 and 102, which are processed in the first two clock cycles of each four-cycle sequence, contain the odd-numbered columns of tiles A0 and A1, respectively, while sub-matrices 101 and 103 contain the even-numbered columns. Effectively, the even-numbered columns of sub-matrices 100 and 102 and the odd-numbered columns of sub-matrices 101 and 103 contain zeroes and are thus skipped over in the computation.

In each clock cycle, data access logic 31 loads input data values selected from one of sub-matrices 100, 101, 102 and 103 into execution unit 22, in accordance with the interleaved sequence that is shown in FIG. 5B. The results of these computations are accumulated into corresponding output sub-matrices 104, 106, 108 and 110, respectively. Sub-matrices 104 and 108 are the results of convolution of the two partitions of tile A0 (sub-matrices 100 and 101) with matrix 72, while sub-matrices 106 and 110 are the results of convolution of the two partitions of tile A1 (sub-matrices 102 and 103) with matrix 72. Data access logic 31 feeds the output values in sub-matrices 104 and 108 to execution unit 22, which sums these output values to generate a first tile 112 (labeled C0). Similarly, summing sub-matrices 106 and 110 gives a second tile 114 (C1).

Tiles 112 and 114 are concatenated to generate an output matrix 111, corresponding to the full convolution of matrices 99 and 72. Data access logic 31 can concatenate the output values of the respective convolutions in tiles 112 and 114, for example, by writing the output values to appropriate locations in memory 34, thus generating output matrix 111.

Figure 6:
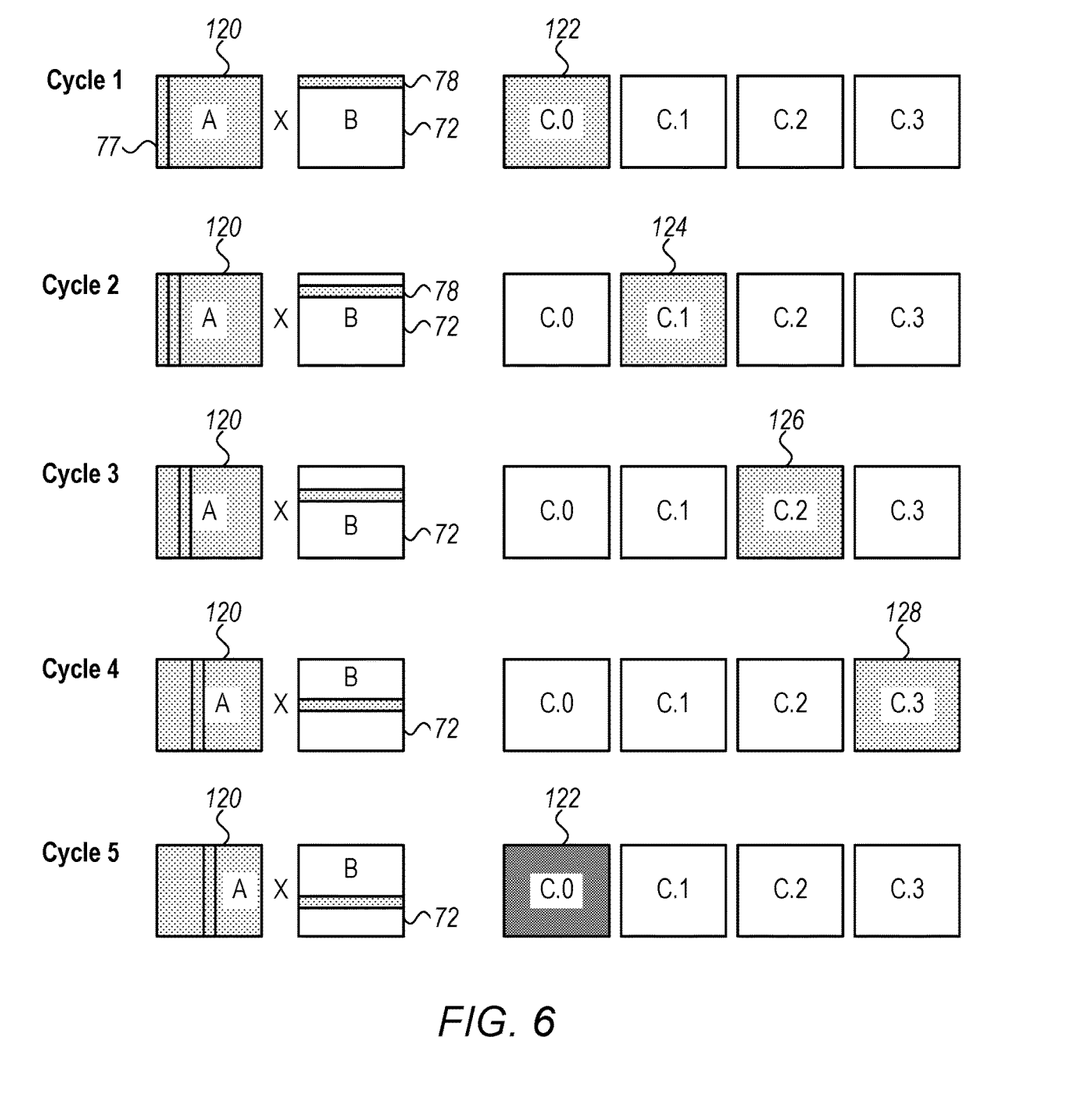
FIG. 6 is a block diagram that schematically illustrates successive cycles in a method for matrix multiplication with enhanced efficiency, in accordance with yet another embodiment of the invention.

FIG. 6 is a block diagram that schematically illustrates successive cycles in a method for matrix multiplication with enhanced efficiency, in accordance with yet another embodiment of the invention. In this case, an input matrix 120 is partitioned into four sub-matrices by assigning, in an interleaved sequence, successive columns of the matrix 120 to different sub-matrices. This partitioning is carried out in a similar manner to the partitioning of tiles A0 and A1 that was described above, but in the present case, each sub-matrix receives only every fourth column, while the remaining columns in each sub-matrix are effective filled with zeroes and thus ignored in the computation.

In this manner, in cycle 1, processing elements 24 receive the data values in the first column 77 of input matrix 120, compute the outer product with the first row 78 of matrix 72, and accumulate the result in a first output sub-matrix 122 (labeled C.0). In cycle 2, the next column and row are multiplied and accumulated into a sub-matrix 124 (C.1), and likewise sub-matrices 126 and 128 in cycles 3 and 4. In clock cycle 5, processing elements 24 return to the first input sub-matrix and accumulate the outer product in output sub-matrix 122, and so forth until all rows and columns of input matrices 120 and 72 have been processed.

Data access logic 31 feeds the output values from sub-matrices 122, 124, 126 and 128 to execution unit 22, which sums these output values to generate the output matrix. This final summation can be deferred so that it is performed only after all the convolution computations of the output sub-matrices have been completed. In this manner, the convolution between input matrices 120 and 72 comprising n×n data values can be completed in a time only slightly longer than n clock cycles (including n cycles required for the convolution computations in an n×n array of processing elements 24, plus a few more cycles for summing the output sub-matrices).

Figure 7:
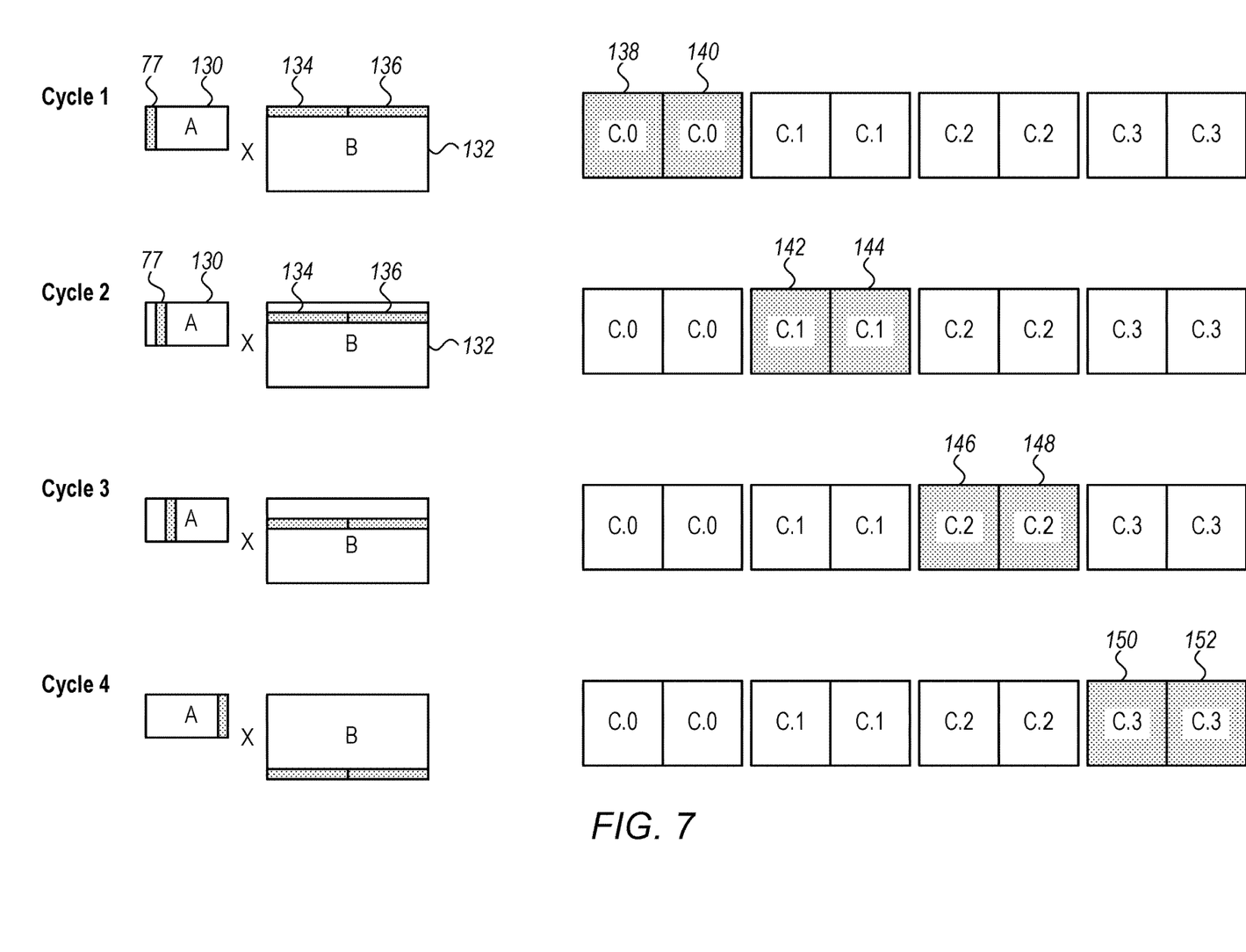
FIG. 7 is a block diagram that schematically shows successive cycles in a method for matrix multiplication with enhanced efficiency, in accordance with an alternative embodiment of the invention.

FIG. 7 is a block diagram that schematically shows successive cycles in a method for matrix multiplication with enhanced efficiency, in accordance with an alternative embodiment of the invention. In this case, an input matrix 130, whose dimensions are smaller than the array of processing elements 24, is to be convolved with a larger input matrix 132. To make efficient use of execution unit 22, data access logic 31 partitions matrix 132 into two adjoining tiles. At each clock cycle, data access logic 31 passes a column 77 from matrix 130 and respective rows 134 and 136 from the tiles of matrix 132 to the processing elements. (In fact, the input data values in column 77 are duplicated, with each value broadcast to two different rows in the array of processing elements, in order to compensate for the smaller dimension of matrix 130.) Thus, data access logic 31 distributes the input data values so that processing elements 24 simultaneously multiply a given row in each of the tiles of matrix 132 by the same column 77 in matrix 130. By the same token, the processing elements could be made to simultaneously multiply a given column in each of the tiles of one matrix by the same row in the other matrix.

In addition, data access logic 31 partitions the input matrices row-by-row into sub-matrices, in a manner similar to that described above with reference to FIG. 6. Consequently, in the first clock cycle, processing elements 24 will accumulate the products of vector 77 with vectors 134 and 136 into the elements of output sub-matrices 138 and 140, respectively. In the next clock cycle, the products will be accumulated into output sub-matrices 142 and 144; then sub-matrices 146 and 148 in the third clock cycle; and sub-matrices 150 and 152 in the fourth clock cycle. In the fifth clock cycle, the processing elements return to compute and accumulate values into sub-matrices 138 and 140, and so forth. Finally, these sub-matrices are summed together and concatenated to give the output matrix.

Figure 8A:
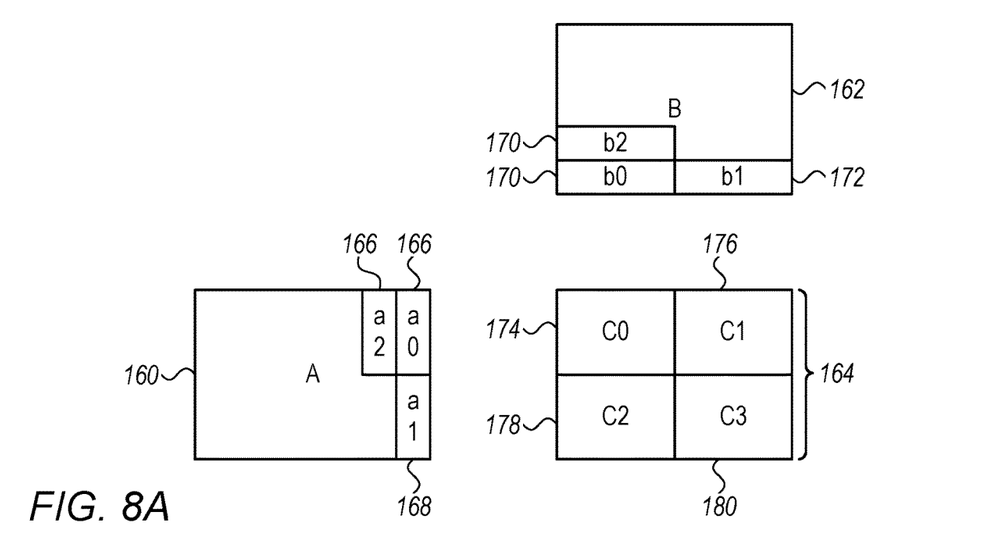
FIG. 8A is a block diagram that schematically illustrates a method for matrix multiplication with enhanced efficiency, in accordance with a further embodiment of the invention.
Figure 8B:
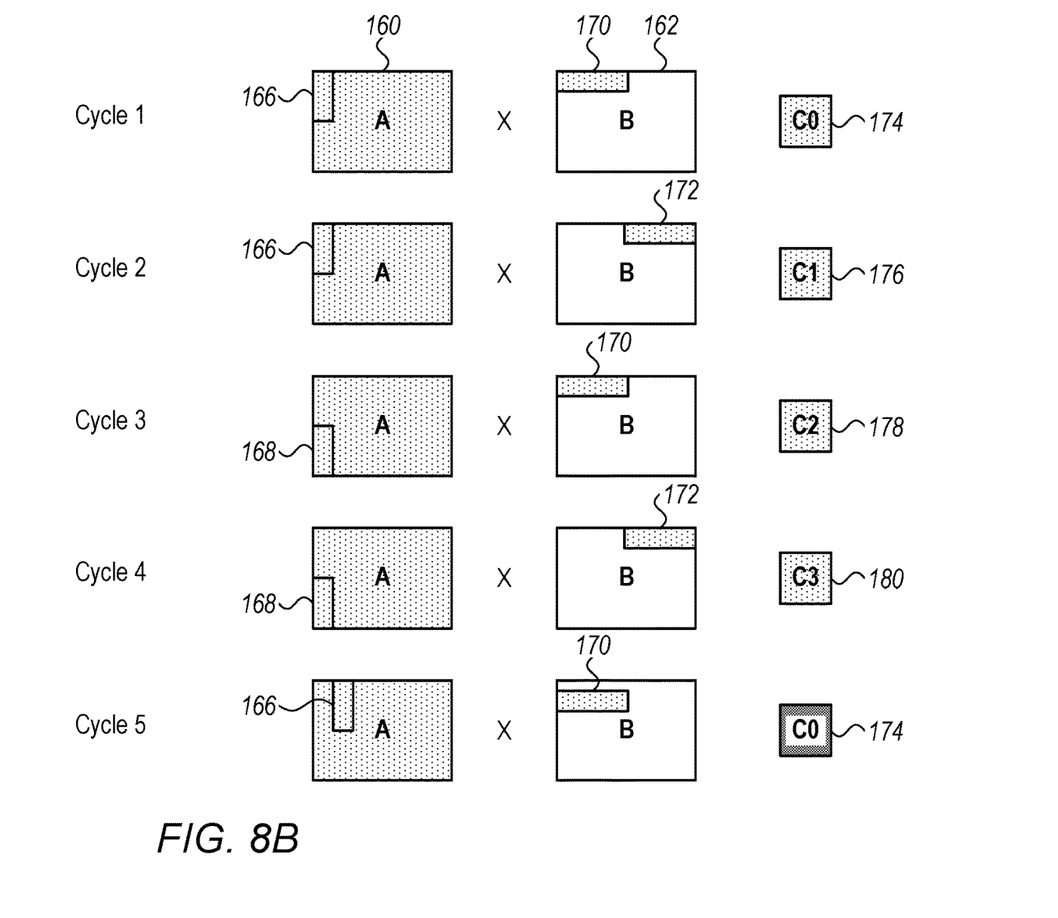
FIG. 8B is a block diagram that schematically shows successive cycles in the method of FIG. 8A, in accordance with an embodiment of the invention.

Reference is now made to FIGS. 8A and 8B, which are block diagrams that schematically illustrate an efficient method for matrix multiplication by execution unit 22, in accordance with a further embodiment of the invention. FIG. 8A shows the structure of sub-matrices into which input matrices 160 and 162 are partitioned, while FIG. 8B shows successive cycles in multiplication of the partitioned matrices, to obtain an output matrix 164. In this embodiment, data access logic partition both of input matrices 160 and 162 into sub-matrices, and distributes the input data values to execution unit 22 so that processing elements 24 convolve each of the sub-matrices of matrix 160 with each of the sub-matrices of matrix 162 to generate output tiles C0, C1, C2 and C3, which are concatenated to generate output matrix 164.

The embodiment of FIGS. 8A/B is appropriate particularly (though not exclusively) for cases in which input matrices 160 and 162 have larger dimensions than the array of processing elements 24. To address this mismatch of dimensions, matrix 160 is partitioned horizontally into two tiles (or sets of tiles). The upper tile comprises columns 166, labeled a0, a2, . . . , consisting of the upper halves of the columns of matrix 160; while the lower tile comprises columns 168, labeled a1, . . . , consisting of the lower halves of the columns. Similarly, matrix 162 is partitioned vertically into two tiles, one comprising rows 170 (b0, b2, . . . ) consisting of the left halves of the rows of matrix 162, and the other comprising rows 172 (b1, . . . ) consisting of the right halves of the rows of matrix 162.

Accelerator 20 generates output matrix 164 by computing and then concatenating four output sub-matrices 174, 176, 178 and 180, corresponding to tiles C0, C1, C2 and C3 of the output matrix. Execution unit 22 computes sub-matrices 174, 176, 178 and 180 in an interleaved sequence, as shown in FIG. 8B: In cycle 1, the first column (a0) 166 in the upper tile of matrix 160 is multiplied by the first row (b0) 170 in the left tile of matrix 162, and the resulting values are accumulated in the part of GP RF 26 that is allocated to output sub-matrix 174. Next, in cycle 2, the same column 166 is multiplied by the first row (b1) 172 in the right tile of matrix 162, and the results are accumulated in the part of GP RF 26 that is allocated to output sub-matrix 174. In cycles 3 and 4, the first column (a1) 168 is the lower tile of matrix 160 is multiplied by the same rows 170 and 172 of matrix 162 as in cycles 1 and 2. The sequence repeats with the next column (a2) 166 and row (b2) 170 in cycle 5, and so forth.

This scheme is advantageous in maximizing the utilization of processing elements 24 while limiting the number of accesses required to memory 34, since every column 166, 168 and row 170, 172 is used twice in close succession. Concatenation of sub-matrices 174, 176, 178 and 180 can be achieved simply by writing the final values of the elements of the sub-matrices to adjacent address ranges in memory 34.

Although certain specific partitioning schemes are described above by way of example, variants and combinations of the techniques and principles described above will be apparent to those skilled in the art after reading the present description and are considered to be within the scope of the present invention. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Computational apparatus, comprising:
a memory, which is configured to contain multiple matrices of input data values;
an array of processing elements, each configured to perform multiplications of respective first and second input operands and to accumulate products of the multiplication to generate respective output values; and
data access logic, which is configured to select from the memory a plurality of mutually-disjoint first matrices and a second matrix, and to distribute to the processing elements the input data values in a sequence that is interleaved among the first matrices, along with corresponding input data values from the second matrix, so as to cause the processing elements to compute, in the interleaved sequence, respective matrix multiplications of each of the first matrices with the second matrix,
wherein the processing elements have a latency of a given number of clock cycles for each multiply-accumulate operation, and wherein the data access logic is configured to select and distribute the input data values in the interleaved sequence from a number of the first matrices that is equal to the given number.

2. The apparatus according to claim 1, wherein the first matrices are mutually-disjoint sub-matrices of a single input matrix that is stored in the memory, and wherein the data access logic is configured to partition the input matrix into the mutually-disjoint sub-matrices and to combine the output values of the respective convolutions to generate an output matrix representing a convolution of the input matrix with the second matrix.

3. The apparatus according to claim 2, wherein the data access logic is configured to partition the input matrix by dividing the input matrix into multiple adjoining tiles, each sub-matrix corresponding to a respective tile, and to concatenate the output values of the respective convolutions to generate the output matrix.

4. The apparatus according to claim 3, wherein the data access logic is configured to further partition each of the tiles by assigning, in the interleaved sequence, successive rows or columns of each tile to different ones of the sub-matrices, and to sum the output values of the respective convolutions to generate output tiles, which are concatenated to generate the output matrix.

5. The apparatus according to claim 4, wherein the data access logic is configured to distribute the input data values so that the processing elements simultaneously multiply a given row or column in each of the tiles by the same column or row in the second matrix.

6. The apparatus according to claim 3, wherein the data access logic is configured to partition the input matrix into first tiles, with corresponding first sub-matrices, and further to partition the second matrix into second tiles, with corresponding second sub-matrices, and to distribute the input data values so that the processing elements convolve each of the first sub-matrices with each of the second sub-matrices to generate output tiles, which are concatenated to generate the output matrix.

7. The apparatus according to claim 2, wherein the data access logic is configured to partition the input matrix by assigning, in the interleaved sequence, successive rows or columns of the input matrix to different ones of the sub-matrices, and to sum the output values of the respective convolutions to generate the output matrix.

8. The apparatus according to claim 7, wherein the processing elements are configured to sum the output values only after completing computation of the respective convolutions of the sub-matrices.

9. The apparatus according to claim 1, wherein each of the processing elements comprises multiple registers and is configured to accumulate the products of the multiplication for each of the first matrices in a different, respective one of the registers in accordance with the interleaved sequence.

10. The apparatus according to claim 1, wherein the interleaved sequence in which the input data values are distributed to the processing elements is selected so that the array of processing elements computes respective outer products of a succession of vector pairs, each vector pair comprising a first vector selected from one of the first matrices and a second vector selected from the second matrix, and sums the outer products to generate multiple third matrices representing the respective matrix multiplications.

11. The apparatus according to claim 10, wherein the data access logic is configured to broadcast the extracted data values in each vector pair to the processing elements so that each extracted data value is distributed to multiple processing elements, such that in each processing cycle, the array of the processing elements computes all matrix elements of an outer product of the first and second vectors in a single processing cycle.

12. Computational apparatus, comprising:
a memory, which is configured to contain multiple matrices of input data values;
an array of processing elements, each configured to perform multiplications of respective first and second input operands and to accumulate products of the multiplication to generate respective output values; and
data access logic, which is configured to select from the memory a plurality of mutually-disjoint first matrices and a second matrix, and to distribute to the processing elements the input data values in a sequence that is interleaved among the first matrices, along with corresponding input data values from the second matrix, so as to cause the processing elements to compute, in the interleaved sequence, respective matrix multiplications of each of the first matrices with the second matrix,
wherein the data access logic is configured to transpose at least one of the first and second matrices before distributing the input data values.

13. A method for computation, comprising:
storing in a memory multiple matrices of input data values;
distributing the input data values from the first matrices in a sequence that is interleaved among the first matrices, along with corresponding input data values from the second matrix, to an array of processing elements, each configured to perform multiplications of respective first and second input operands and to accumulate products of the multiplication to generate respective output values; and
multiplying the distributed data values and accumulating the products in the processing elements so as to compute, in the interleaved sequence, respective matrix multiplications of the first matrices with the second matrix,
wherein the processing elements have a latency of a given number of clock cycles for each multiply-accumulate operation, and wherein distributing the input data values comprises selecting and distributing the input data values in the interleaved sequence from a number of the first matrices that is equal to the given number.

14. The method according to claim 13, wherein the first matrices are mutually-disjoint sub-matrices of a single input matrix that is stored in the memory, and distributing the data values comprises partitioning the input matrix into the mutually-disjoint sub-matrices, and wherein the method comprises combining the output values of the respective convolutions to generate an output matrix representing a convolution of the input matrix with the second matrix.

15. The method according to claim 14, wherein partitioning the input matrix comprises dividing the input matrix into multiple adjoining tiles, each sub-matrix corresponding to a respective tile, and wherein combining the output values comprises concatenating the output values of the respective convolutions to generate the output matrix.

16. The method according to claim 15, wherein partitioning the input matrix comprises further partitioning each of the tiles by assigning, in the interleaved sequence, successive rows or columns of each tile to different ones of the sub-matrices, and wherein combining the output values comprises summing the output values of the respective convolutions to generate output tiles, which are concatenated to generate the output matrix.

17. The method according to claim 16, wherein partitioning the input matrix comprises distributing the input data values so that the processing elements simultaneously multiply a given row or column in each of the tiles by the same column or row in the second matrix.

18. The apparatus according to claim 15, wherein the input matrix is partitioned into first tiles, with corresponding first sub-matrices, and wherein distributing the input data further comprises partitioning the second matrix into second tiles, with corresponding second sub-matrices, and distributing the input data values so that the processing elements convolve each of the first sub-matrices with each of the second sub-matrices to generate output tiles, which are concatenated to generate the output matrix.

19. The method according to claim 14, wherein partitioning the input matrix comprises assigning, in the interleaved sequence, successive rows or columns of the input matrix to different ones of the sub-matrices, and wherein combining the output values comprises summing the output values of the respective convolutions to generate the output matrix.

20. The method according to claim 19, wherein the output values are summed only after completing computation of the respective convolutions of the sub-matrices.

21. The method according to claim 13, wherein each of the processing elements comprises multiple registers, and wherein the products of the multiplication for each of the first matrices are accumulated in a different, respective one of the registers in accordance with the interleaved sequence.

22. The method according to claim 13, wherein the interleaved sequence in which the input data values are distributed to the processing elements is selected so that the array of processing elements computes respective outer products of a succession of vector pairs, each vector pair comprising a first vector selected from one of the first matrices and a second vector selected from the second matrix, and sums the outer products to generate multiple third matrices representing the respective matrix multiplications.

23. The method according to claim 22, wherein distributing the input data values comprises broadcasting the extracted data values in each vector pair to the processing elements so that each extracted data value is distributed to multiple processing elements, such that in each processing cycle, the array of the processing elements computes all matrix elements of an outer product of the first and second vectors in a single processing cycle.

24. A method for computation, comprising:
storing in a memory multiple matrices of input data values;
distributing the input data values from the first matrices in a sequence that is interleaved among the first matrices, along with corresponding input data values from the second matrix, to an array of processing elements, each configured to perform multiplications of respective first and second input operands and to accumulate products of the multiplication to generate respective output values; and
multiplying the distributed data values and accumulating the products in the processing elements so as to compute, in the interleaved sequence, respective matrix multiplications of the first matrices with the second matrix,
wherein distributing the input data values comprises transposing at least one of the first and second matrices before distributing the input data values.

* * * * *